(12) United States Patent
Ruiz

(10) Patent No.: US 12,116,433 B2
(45) Date of Patent: Oct. 15, 2024

(54) TERPOLYMERS FOR CAPS AND CLOSURES

(71) Applicant: Braskem S.A., Camaçari (BR)

(72) Inventor: Francisco Carlos Ruiz, São Paulo (BR)

(73) Assignee: Braskem S.A., Camaçari (BR)

( * ) Notice: Subject to any disclaimer, the term of this patent is extended or adjusted under 35 U.S.C. 154(b) by 830 days.

(21) Appl. No.: 17/263,098

(22) PCT Filed: Jul. 24, 2019

(86) PCT No.: PCT/IB2019/020025
§ 371 (c)(1),
(2) Date: Jan. 25, 2021

(87) PCT Pub. No.: WO2020/021342
PCT Pub. Date: Jan. 30, 2020

(65) Prior Publication Data
US 2021/0198394 A1    Jul. 1, 2021

Related U.S. Application Data

(60) Provisional application No. 62/702,589, filed on Jul. 24, 2018.

(51) Int. Cl.
| | | |
|---|---|---|
| *B65D 41/00* | (2006.01) | |
| *B29D 99/00* | (2010.01) | |
| *B65D 41/04* | (2006.01) | |
| *C08F 210/06* | (2006.01) | |
| *C08F 210/16* | (2006.01) | |
| *B29K 23/00* | (2006.01) | |

(52) U.S. Cl.
CPC ........ *C08F 210/06* (2013.01); *B29D 99/0096* (2013.01); *B65D 41/0435* (2013.01); *B29K 2023/12* (2013.01); *C08F 210/16* (2013.01); *C08F 2500/08* (2013.01); *C08F 2500/12* (2013.01); *C08F 2500/27* (2021.01); *C08F 2500/30* (2021.01); *C08F 2500/36* (2021.01); *C08F 2800/20* (2013.01)

(58) Field of Classification Search
CPC .. C08F 210/16; C08F 210/06; C08F 2500/36; C08L 23/16; B65D 41/0435; B65D 41/04
See application file for complete search history.

(56) References Cited

U.S. PATENT DOCUMENTS

| | | | | |
|---|---|---|---|---|
| 4,634,745 A * | 1/1987 | Ehrig | ............... | C08F 210/06 526/87 |
| 5,296,548 A * | 3/1994 | Covezzi | ............... | C08F 297/08 525/240 |
| 5,962,094 A * | 10/1999 | Osterkamp | ............ | B65D 53/00 428/35.8 |
| 9,284,442 B2 * | 3/2016 | Hoslet | ................... | C08F 210/06 |
| 10,214,640 B2 * | 2/2019 | Marchini | ........... | B65D 41/0435 |

FOREIGN PATENT DOCUMENTS

| | | | | |
|---|---|---|---|---|
| CN | 1061031 A | 5/1992 | | |
| CN | 103339158 A | 10/2013 | | |
| CN | 105899554 A | 8/2016 | | |
| EP | 0324250 A2 | 7/1989 | | |
| EP | 0483523 A1 | 5/1992 | | |
| JP | 7-76360 A * | 3/1995 | ............ | B65D 53/06 |
| JP | H1180233 A | 3/1999 | | |
| JP | 2000191862 A | 7/2000 | | |
| JP | 2002265709 A | 9/2002 | | |
| JP | 2008013728 A | 1/2008 | | |
| WO | 2012072776 A1 | 6/2012 | | |
| WO | WO 2016/096281 A1 * | 6/2016 | ............. | C08L 23/20 |
| WO | 2016188982 A1 | 12/2016 | | |

OTHER PUBLICATIONS

JP 7-76360 A (Mar. 20, 1995); machine translation. (Year: 1995).*
Office Action issued in corresponding Japanese Application No. 2021-504279; mailed Jan. 4, 2023 (9 pages).
Office Action issued in corresponding Chinese Application No. 201980055351.3; dated Jan. 11, 2023 (21 pages).
International Search Report issued in International Application No. PCT/IB2019/020025, mailed Nov. 20, 2019 (4 pages).
Written Opinion issued in International Application No. PCT/IB2019/020025, mailed Nov. 20, 2019 (5 pages).
Office Action issued in corresponding Chinese Application No. 201980055351.3; dated Jan. 28, 2022 (14 pages).

* cited by examiner

*Primary Examiner* — Rip A Lee
(74) *Attorney, Agent, or Firm* — Osha Bergman Watanabe & Burton LLP

(57) ABSTRACT

Polymer compositions may comprise propylene, present in a range of 80 to 95 wt % of the polymer composition, and two comonomers selected from a group comprising ethylene and C4-C10 alpha olefins, wherein the polymer composition has a total content of the comonomers in the range of 5 to 20 wt % of the polymer composition. Cap liners may be formed from the polymer compositions. Caps may comprise a closure formed from polypropylene and a polypropylene-based cap liner that lines at least a portion of the closure.

19 Claims, No Drawings

TERPOLYMERS FOR CAPS AND CLOSURES

BACKGROUND

Caps and closures for many applications, particularly those utilized for sealing carbonated beverages, are generally made from either polypropylene or high-density polyethylene (HDPE), with each material proffering different advantages. For example, HDPE closures are typically used for organoleptic-sensitive applications and provide high impact strength, whereas polypropylene closures provide superior stress cracking resistance and good clarity.

While polypropylene has historically been the dominant closure material in the carbonated soft drink market, the material has largely been replaced with HDPE caps for both cost and sustainability reasons. HDPE caps used for carbonated beverages are produced as a single piece, where small protuberances contact the neck to form a seal when fully torqued. As polypropylene does not possess the requisite creep resistance to provide a secure seal in such a manner, polypropylene caps are generally two-piece, comprising both a closure and a separate cap liner made from a thermoplastic elastomer. The use of multiple materials makes these caps more difficult to recycle and thus less sustainable than the one-piece HDPE alternatives. Additionally, the recent decrease in the cost of natural gas has resulted in polyethylene being a cheap alternative to polypropylene, resulting in the use of HDPE being economically advantageous. Despite these factors, polypropylene is still being used to produce caps because of its possession of physical properties that are excellent for certain applications.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed herein relate to a polymer composition that may comprise propylene in a range of 80 to 95 wt % of the polymer composition, and two comonomers selected from a group comprising ethylene and C4-C10 alpha olefins, the polymer composition having a total content of the comonomers in the range of 5 to 20 wt % of the polymer composition.

In another aspect, embodiments disclosed herein relate to a cap liner that may be formed from a polymer composition, the polymer composition comprising propylene in a range of 80 to 95 wt % of the polymer composition, and two comonomers selected from a group comprising ethylene and C4-C10 alpha olefins, the polymer composition having a total content of the comonomers in the range of 5 to 20 wt % of the polymer composition.

In another aspect, embodiments disclosed herein relate to a cap that may comprise a closure and a cap liner that lines at least a portion of the closure, wherein the cap liner may be formed from a polymer composition comprising propylene in a range of 80 to 95 wt % of the polymer composition; and two comonomers selected from a group comprising ethylene and C4-C10 alpha olefins, the polymer composition having a total content of the comonomers in the range of 5 to 20 wt % of the polymer composition.

In another aspect, embodiments disclosed herein relate to a cap that may comprise a closure formed from polypropylene and a polypropylene-based cap liner that lines at least a portion of the closure.

In another aspect, embodiments disclosed herein relate to a method that may comprise compression molding a polymer composition to form a cap liner, wherein the polymer composition may comprise propylene in a range of 80 to 95 wt % of the polymer composition, and two comonomers selected from a group comprising ethylene and C4-C10 alpha olefins, the polymer composition having a total content of the comonomers in the range of 5 to 20 wt % of the polymer composition.

Other aspects and advantages of the claimed subject matter will be apparent from the following description and the appended claims.

DETAILED DESCRIPTION

One or more embodiments disclosed herein relate to polymer compositions that comprise propylene, and two alpha olefin comonomers, such as selected from ethylene, and a C4-C10 alpha olefin monomer. In particular, polymer compositions of the present disclosure may be used to form cap liners comprising propylene and two other comonomers. As mentioned above, conventional polypropylene caps are generally two pieces: formed of a closure and a separate cap liner, which is conventionally made from a thermoplastic elastomer. However, in accordance with embodiments of the present disclosure, the two-piece cap may include propylene-based cap liner lining at least a portion of a polypropylene closure.

Two-piece caps comprise a closure and a cap liner, with the cap liner generally lining at least a portion of the interior of the closure. The purpose of the cap liner may be to provide a secure seal between the closure and a vessel upon the application of torque to the closure. As mentioned above, in a conventional two-piece cap, the cap liner is formed from a different material than the closure.

Polypropylene possesses many physical properties that render it highly suitable for forming closures. For example, polypropylene resin is lightweight, possesses good dimensional stability, and provides resistance to stress-cracking, oils, greases, acids, alkalis, and most solvents. Polypropylene also has a natural translucence, high contact clarity, good chemical compatibility, and high heat tolerance, while polypropylene injection-molded or compression-molded closures have very smooth surfaces, and enable extremely accurate sizing tolerances.

Cap liners are generally made from materials that provide excellent sealing characteristics for the desired application. However, cap liners may also provide consistent short-, medium- and long-term opening torques to enable consumer-friendly functionality. The conventional use of different materials for the cap liner and the closure results in a multi-material cap that is difficult to recycle and, thus, unsustainable. In contrast, embodiments of the present disclosure may provide polypropylene-based cap liners, with excellent sealing properties, which can be used with polypropylene closures to yield mono-material caps.

In one or more embodiments of the present disclosure, cap liners are formed from polymer compositions that comprise propylene as well as other monomers, which may allow the properties of the polymer composition to be altered through the inclusion of the other monomers. Such cap liners can, in combination with propylene closures, yield sustainable monomaterial polypropylene caps. Such caps may possess, among others: excellent sealing, 100% recyclability, excellent organoleptic properties, consistent opening torques, low migration values, as well as being PVC free and suitable for the whole range of beverage processing methods.

Polymer Compositions

Polymer compositions of one or more embodiments of the present disclosure may be terpolymer compositions, which result from copolymerization of three discrete monomers including propylene and two comonomers. In one or more embodiments, the comonomers are selected from a group consisting of ethylene and C4-C10 alpha olefins. In one or more embodiments, polymer compositions are formulated that comprise propylene in an amount ranging from 80 to 95 wt. % of the polymer composition and the comonomers in a total amount ranging from 5 to 20 wt. % of the polymer composition. In some embodiments, polymer compositions may comprise one of the comonomers in an amount ranging from 1 to 7 wt % and the other of the comonomers in an amount of the range of about 4 to 13 wt %.

The polymer compositions of one or more embodiments of the present disclosure may comprise comonomers of ethylene and a C4-C10 alpha olefin. In some embodiments, the terpolymer comprises propylene in an amount ranging from 80 to 95 wt. %, ethylene in an amount ranging from 1 to 7 wt. % and the C4-C10 alpha olefin in an amount ranging from 4 to 13 wt. %.

The polymer compositions of one or more embodiments of the present disclosure may comprise comonomers of ethylene and butylene. In some embodiments, the terpolymer is a propylene-ethylene-butylene copolymer comprising propylene in an amount ranging from 80 to 95 wt. %, ethylene in an amount ranging from 1 to 7 wt. % and butylene in an amount ranging from 4 to 13 wt. %.

In one or more embodiments, the polymer composition may exhibit a melt flow rate, according to ASTM D1238, ranging from about 2.0 to 15.0 g/10 min.

In one or more embodiments, the polymer composition may exhibit a density, according to ASTM D792, ranging from about 0.880 to 0.908 g/cm$^3$.

In one or more embodiments, the polymer composition may exhibit a flexural modulus at the −1% secant, according to ASTM D790, ranging from about 500 to 900 MPa.

In one or more embodiments, the polymer composition may exhibit a tensile strength at yield, according to ASTM D638, ranging from about 18 to 35 MPa.

In one or more embodiments, the polymer composition may exhibit a tensile elongation at yield, according to ASTM D638, ranging from about 9 to 19%.

In one or more embodiments, the polymer composition may exhibit a R-scale Rockwell hardness, according to ASTM D785, ranging from about 60 to 90.

In one or more embodiments, the polymer composition may exhibit a notched Izod impact strength at 23° C., according to ASTM D256, ranging from about 40 to 85 J/m.

In one or more embodiments, the polymer composition may exhibit a notched Izod impact strength at −20° C., according to ASTM D256, ranging from about 10 to 40 J/m.

In one or more embodiments, the polymer composition may exhibit a deflection temperature under load at 0.455 MPa, according to ASTM D648, ranging from about 65 to 89° C.

In one or more embodiments, the polymer composition may exhibit a deflection temperature under load at 1.820 MPa, according to ASTM D648, ranging from about 40 to 58° C.

In one or more embodiments, the polymer composition may exhibit a Vicat softening temperature at 10 N, according to ASTM D1525, ranging from about 110 to 130° C.

Any of such compositions described above may be used to form a cap liner in accordance with embodiments of the present disclosure.

Caps

Caps according to one or more embodiments of the present disclosure are two-piece caps that comprise both a closure and a cap liner. In some embodiments, the cap liner may line at least a portion of the closure.

Caps of one or more embodiments may comprise a closure formed from propylene, which may be used in combination with a cap liner formed from propylene (such as any of the above described polymer compositions), thereby forming a mono-material cap. In some embodiments, caps may comprise a polypropylene closure formed from propylene homopolymers, random copolymers or heterophasic copolymers.

Polypropylene copolymers may be prepared with one or more C2 or C4-C20 olefin comonomers. In one or more embodiments, polypropylene copolymers in accordance with the present disclosure may include heterophasic copolymers having an internal polymer phase at a weight percent (wt %) of the heterophasic copolymer in a range having a lower limit selected from any of 1 wt %, 5 wt %, 10 wt %, and 20 wt %, to an upper limit selected from any of 30 wt %, 40 wt % and 50 wt % where any lower limit may be paired with any upper limit. In some embodiments, the internal phase (rubber phase) of the heterophasic copolymer may include an ethylene copolymer. In an embodiment, the ethylene content of the rubber phase in the heterophasic copolymer may range from a lower limit selected from 10 wt %, 30 wt %, 40 wt % and 45 wt % to an upper limit selected from 50 wt %, 60 wt % and 70 wt % of the rubber phase in the heterophasic copolymer, where any lower limit may be paired with any upper limit.

In one or more embodiments, caps in accordance with the present disclosure may comprise a closure made from a polypropylene homopolymer that exhibits a melt flow rate, according to ASTM D1238, ranging from about 1.0 to 8.0 g/10 min.

In one or more embodiments, caps in accordance with the present disclosure may comprise a closure made from a polypropylene homopolymer that exhibits a density, according to ASTM D792, ranging from about 0.900 to 0.908 g/cm$^3$.

In one or more embodiments, caps in accordance with the present disclosure may comprise a closure made from a polypropylene homopolymer that exhibits a flexural modulus at the −1% secant, according to ASTM D790, ranging from about 1300 to 1900 MPa.

In one or more embodiments, caps in accordance with the present disclosure may comprise a closure made from a polypropylene homopolymer that exhibits a tensile strength at yield, according to ASTM D638, ranging from about 30 to 45 MPa.

In one or more embodiments, caps in accordance with the present disclosure may comprise a closure made from a polypropylene homopolymer that exhibits a tensile elongation at yield, according to ASTM D638, ranging from about 5 to 15%.

In one or more embodiments, caps in accordance with the present disclosure may comprise a closure made from a polypropylene homopolymer that exhibits a R scale Rockwell hardness, according to ASTM D785, ranging from about 80 to 105.

In one or more embodiments, caps in accordance with the present disclosure may comprise a closure made from a polypropylene homopolymer that exhibits a notched Izod impact strength at 23° C., according to ASTM D256, ranging from about 20 to 50 J/m.

In one or more embodiments, caps in accordance with the present disclosure may comprise a closure made from a polypropylene homopolymer that exhibits a deflection temperature under load at 0.455 MPa, according to ASTM D648, ranging from about 95 to 120° C.

In one or more embodiments, caps in accordance with the present disclosure may comprise a closure made from a heterophasic polypropylene copolymer that exhibits a melt flow rate, according to ASTM D1238, ranging from about 4.0 to 10.0 g/10 min.

In one or more embodiments, caps in accordance with the present disclosure may comprise a closure made from a heterophasic polypropylene copolymer that exhibits a density, according to ASTM D792, ranging from about 0.850 to 0.905 g/cm$^3$.

In one or more embodiments, caps in accordance with the present disclosure may comprise a closure made from a heterophasic polypropylene copolymer that exhibits a flexural modulus at the $-1\%$ secant, according to ASTM D790, ranging from about 1100 to 1600 MPa.

In one or more embodiments, caps in accordance with the present disclosure may comprise a closure made from a heterophasic polypropylene copolymer that exhibits a tensile strength at yield, according to ASTM D638, ranging from about 25 to 40 MPa.

In one or more embodiments, caps in accordance with the present disclosure may comprise a closure made from a heterophasic polypropylene copolymer that exhibits a tensile elongation at yield, according to ASTM D638, ranging from about 5 to 13%.

In one or more embodiments, caps in accordance with the present disclosure may comprise a closure made from a heterophasic polypropylene copolymer that exhibits a R scale Rockwell hardness, according to ASTM D785, ranging from about 80 to 105.

In one or more embodiments, caps in accordance with the present disclosure may comprise a closure made from a heterophasic polypropylene copolymer that exhibits a notched Izod impact strength at 23° C., according to ASTM D256, ranging from about 55 to 110 J/m.

In one or more embodiments, caps in accordance with the present disclosure may comprise a closure made from a heterophasic polypropylene copolymer that exhibits a notched Izod impact strength at $-20$° C., according to ASTM D256, ranging from about 15 to 35 J/m.

In one or more embodiments, caps in accordance with the present disclosure may comprise a closure made from a heterophasic polypropylene copolymer that exhibits a deflection temperature under load at 0.455 MPa, according to ASTM D648, ranging from about 95 to 115° C.

Caps of one or more embodiments may comprise a cap liner formed from propylene and two monomers (such as those compositions described above) that is used in combination with any of the above described closures. That is, as will be obvious to one of ordinary skill in the art, caps in accordance with the present disclosure may comprise any combination of closures and cap liners disclosed herein.

Methods of Forming Closures and Cap Liners

In one or more embodiments, cap liners in accordance with the present disclosure are formed by compression molding. In one or more embodiments, a closure acts as a cavity and compression molding forms the cap liner within the closure. In some embodiments, a polymer composition is placed directly into the closure and, after compression molding, a resulting cap liner bonds with the closure. In one or more embodiments, cap liners are formed separately from the closure and later inserted to line the closure.

In one or more embodiments, closures in accordance with the present disclosure are formed by either injection or compression molding. In one or more embodiments, closures may be formed that comprise a protrusion in the outer rim to hold a cap liner in place.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(1) for any limitations of any of the claims herein, except for those in which the claim expressly uses the words 'means for' together with an associated function.

What is claimed is:

1. A cap liner formed by compression molding a terpolymer composition comprising:
   propylene present in a range of 80 to 95 wt % of the terpolymer composition; and
   two comonomers selected from the group consisting of ethylene and C4-C10 alpha olefins,
   wherein the terpolymer composition has a total content of the comonomers in a range of 5 to 20 wt % of the terpolymer composition,
   wherein the terpolymer composition has a flexural modulus at the $-1\%$ secant, according to ASTM D790, ranging from 500 to 900 MPa, and
   the terpolymer composition has a melt flow rate, according to ASTM D1238, ranging from 2.0 to 15.0 g/10 min.

2. The cap liner of claim 1, wherein the comonomers are ethylene and butylene.

3. The cap liner of claim 2, wherein the terpolymer composition has an ethylene content in a range of 1 to 7 wt % of the terpolymer composition and a butylene content in a range of 4 to 13 wt % of the terpolymer composition.

4. The cap liner of claim 1, wherein the terpolymer composition has a density, according to ASTM D792, ranging from 0.880 to 0.908 g/cm$^3$.

5. The cap liner of claim 1, wherein the terpolymer composition has a tensile strength at yield, according to ASTM D638, ranging from 18 to 35 MPa.

6. The cap liner of claim 1, wherein the terpolymer composition has a tensile elongation at yield, according to ASTM D638, ranging from 9 to 19%.

7. The cap liner of claim 1, wherein the terpolymer composition has a R-scale Rockwell hardness, according to ASTM D785, ranging from 60 to 90.

8. The cap liner of claim 1, wherein the terpolymer composition has a Notched Izod Impact strength at 23° C., according to ASTM D256, ranging from 40 to 85 J/m.

9. The cap liner of claim 1, wherein the terpolymer composition has a Notched Izod Impact strength at −20° C., according to ASTM D256, ranging from 10 to 40 J/m.

10. The cap liner of claim 1, wherein the terpolymer composition has a deflection temperature under load at 0.455 MPa, according to ASTM D648, ranging from 65 to 89° C.

11. The cap liner of claim 1, wherein the terpolymer composition has a deflection temperature under load at 1.820 MPa, according to ASTM D648, ranging from 40 to 58° C.

12. The cap liner of claim 1, wherein the terpolymer composition has a Vicat softening temperature at 10 N, according to ASTM D1525, ranging from 110 to 130° C.

13. A cap, comprising:
a closure; and
the cap liner of claim 1 lining at least a portion of the closure.

14. The cap of claim 13, wherein the closure is formed from polypropylene.

15. A method, comprising:
compression molding the terpolymer composition to form the cap liner of claim 1.

16. The method of claim 15, further comprising:
injection molding a second polymer composition to form a closure; and
lining the closure with the cap liner.

17. The method of claim 15, further comprising:
compression molding a second polymer composition to form a closure; and
lining the closure with the cap liner.

18. The method of claim 15, further comprising:
molding a second polymer composition to form a closure; and
lining the closure with the cap liner;
wherein compression molding the terpolymer composition to form the cap liner and the lining are simultaneous such that compression molding the terpolymer composition to form the cap liner is performed within the closure.

19. The method of claim 15, further comprising:
molding a second polymer composition to form a closure; and
lining the closure with the cap liner;
wherein compression molding the terpolymer composition to form the cap liner occurs prior to lining the closure.

* * * * *